United States Patent [19]

Woolf et al.

[11] 3,784,757

[45] Jan. 8, 1974

[54] LIMITED ACCESS DIALING SYSTEM

[75] Inventors: Julius Isadore Woolf, Teaneck, N.J.; Roman Sadowy, Jr., New York, N.Y.; Russell John Gershman, Englewood Cliffs, N.J.

[73] Assignee: Information Flow Incorporated, in care of Ocean & Atmospheric Science Inc., Dobbs Ferry, N.Y.

[22] Filed: June 14, 1971

[21] Appl. No.: 152,538

[52] U.S. Cl. .............................................. 179/18 DA

[51] Int. Cl. .............................................. H04m 1/66

[58] Field of Search ..................... 179/18 DA, 18 D, 179/18 EB, 18 ES

[56] References Cited

UNITED STATES PATENTS

| | | | |
|---|---|---|---|
| 3,316,355 | 4/1967 | Hanna et al. | 179/18 EB |
| 3,626,105 | 12/1971 | De Jean et al. | 179/18 ES |
| 3,553,382 | 1/1971 | Knox et al. | 179/18 DA |
| 3,569,634 | 3/1971 | Amadasi et al. | 179/18 DA |

*Primary Examiner*—Thomas W. Brown

[57] ABSTRACT

A limited access dialing system having a plurality of line monitors each connected in parallel to a separate trunk line to be monitored and communicating through parallel lines to a central memory system containing a list of authorized telephone numbers. The line monitor unit counts the pulses of each digit and stores the digits in a number register. It determines if an area code has been dialed and if a leading "1" has been dialed and accommodates for them. The central memory system sequentially interrogates the line monitors until it finds one which is storing a number in its registers. It then stops interrogating and checks the number stored against the authorized list. If the number is authorized the line monitor is reset and the sequential interrogating is resumed. If the number is not authorized, the trunk line is interrupted before resetting. The numbers in the list can be updated by entering or removing numbers through a control panel.

38 Claims, 5 Drawing Figures

INVENTORS
JULIUS ISADORE WOOLF
ROMAN SADOWY, JR.
RUSSELL JOHN GERSHMAN

INVENTORS
JULIUS ISADORE WOOLF
ROMAN SADOWY, JR.
RUSSELL JOHN GERSHMAN

INVENTORS
JULIUS ISADORE WOOLF
ROMAN SADOWY, JR.
RUSSELL JOHN GERSHMAN

INVENTORS
JULIUS ISADORE WOOLF
ROMAN SADOWY, JR.
RUSSELL JOHN GERSHMAN

INVENTORS
JULIUS ISADORE WOOLF
ROMAN SADOWY, JR.
RUSSELL JOHN GERSHMAN

LIMITED ACCESS DIALING SYSTEM

This invention relates to telephone systems and more particularly to means for providing limited access from a dialing station.

BACKGROUND OF THE INVENTION

With the increased usage of telephones for voice and data communications, and with the introduction of direct dialing to long distance stations, there has developed a need for restricting the use of telephones to authorized individuals and to limit the accessible numbers to be reached. This problem is especially important to private branch exchange systems (PBX) and private automatic branch exchange systems (PABX). Without any restrictions on accessibility, an individual may have unlimited use of a company telephone to place expensive long distance calls, and the company will be charged for such calls. Also, it is often desired that certain telephones be used only for business purposes and no personal calls be permitted on them. It is therefore necessary to limit the accessible numbers from monitored telephones.

Many systems are presently available for restricting telephone usage. All of the known systems involve complex switching devices and all have limitations to their application and feasibility. Some systems are of the series type, in that the entire checking system is interconnected in series between the calling number and the called number. As a number is dialed on the calling phone, the number passes through the usual telephone equipment and is retained within the calling station until it has been checked by the receiving station as an authorized number. Upon receiving an authorization, the number continues along the telephone channel to complete the call. The series type systems therefore require the use of internal telephone switching equipment and must be interconnected within such equipment. Furthermore, this type system provides a check at the receiving end and determines if the called number is authorized to be reached by the particular calling number, rather than checking at the sending end to determine if the particular called number is authorized to be dialed by the calling number. In addition, such systems must have access to both the called station and the calling station.

Other known systems are of the parallel type, in that they are independent of the internal telephone switching system and attach externally to the telephone lines with separate equipment. While these systems are more easily installed, they generally are limited in usage to PBX or PABX systems and attach between the telephone handset and the private central switching office. Each line is monitored for certain dialed digits and at the occurrence of unauthorized digits, the central switching prevents the handset from connecting to a trunk line. In these systems individual number checking units communicate with the central switching station. For a telephone system with a large number of users, this requires a large number of checking units. Because of cost restrictions and size limitations, the checking units have a very limited capacity of authorized number checks. Typically, such systems are limited to checking three digits of the number dialed.

Still other available limited access systems have additional problems and limitations. Some are restricted to either private branch exchanges or to individual unit telephones. Furthermore, there is usually no provision for easily updating the list of authorized numbers as conditions change. Also, most of the known systems do not provide a capability of recognizing only outgoing calls from a PABX system while not restricting internal or toll free calls. In addition, many of the known systems can not accommodate both calls dialed with a preceeding area code as well as calls dialed without such area code.

Accordingly, it is an object of this invention to provide a limited access telephone dialing system.

A further object is to provide an independent and easily detachable apparatus which connects to a telephone trunk line and monitors dialed numbers.

Still a further object is to provide a limited access telephone system which can monitor and check numbers dialed both with and without a preceeding area code.

Another object is to provide a telephone monitoring system which can monitor numbers dialed both with a leading 1 digit as well as those dialed without the leading 1.

Yet another object is to provide a limited access telephone system which monitors dialed numbers at the sending end only.

A further object is to provide a telephone switching system having a plurality of monitors, each connected to an individual telephone trunk line and wherein all the monitors are coupled to a central checking system.

Yet another object of the invention is to provide a limited access telephone system which attaches only to the sending end, checks if the number dialed is authorized and disconnects the trunk line if such number is not authorized.

Still a further object is to provide a limited access telephone system having a plurality of monitors each connected between an individual telephone handset and a trunk line coupled thereto, and a single central checking unit having a list of authorized numbers.

A further object is to provide a telephone switching system having a central checking unit which sequentially interrogates each of a plurality of line monitor units and services a unit upon request by that unit.

Yet another object of the invention is to provide a limited access telephone system for use with a private exchange system which restricts some of the telephones while not restricting others.

An additional object of this invention is to provide a limited access dialing system having a list of authorized numbers and wherein the list can be modified by adding or removing numbers.

Another object is to provide an apparatus for limiting the access from a dial telephone to numbers contained in an authorized list and which is attachable to PBX, PABX, public or home telephone units.

Still another object is to provide a simple, feasible and novel limited access dialing system which eliminates the aforementioned problems of the prior art systems.

These and other objects and features of the invention will be more apparent from the following description of the invention.

BRIEF DESCRIPTION OF THE INVENTION

The limited access dialing system of this invention includes a plurality of individual electronic monitor units, each attached to a telephone subscribers trunk line. The monitor units are coupled to a central memory system having a list of authorized telephone numbers. The monitors do not effect incoming calls, but prevent outgoing calls unless the called number is contained within the authorized list. When a number is dialed, the monitor unit checks the presence or absence of an area code, decodes the number and sets a flag signal indicating that service is requested from the memory system. The central memory system sequentially interrogates the individual monitor units until it detects a service request flag. It then checks the number decoded by that unit against the authorized list. If the number is present, the monitor unit is reset, the sequential interrogation continues and the call is completed normally. If the number is not present, the caller's connection to the trunk line is interrupted, thus preventing the call from being completed. The monitor unit is then reset and the sequential interrogation continues.

A control panel is connected to the memory system which permits manual checking of a single number, adding or deleting numbers from the list, obtaining a printout of the complete list arranged in order of area codes and telephone exchanges, and counting the number of times a particular number was called.

The monitor units can also detect the presence or absence of a leading 1 as is required on some dialing systems. Also, the monitors can be arranged to permit calls from specified unrestricted telephones, to be completed without checking.

The aforementioned description will now be more fully explained in conjunction with the accompanying figures.

DETAILED DESCRIPTION OF THE INVENTION

Figure 1:
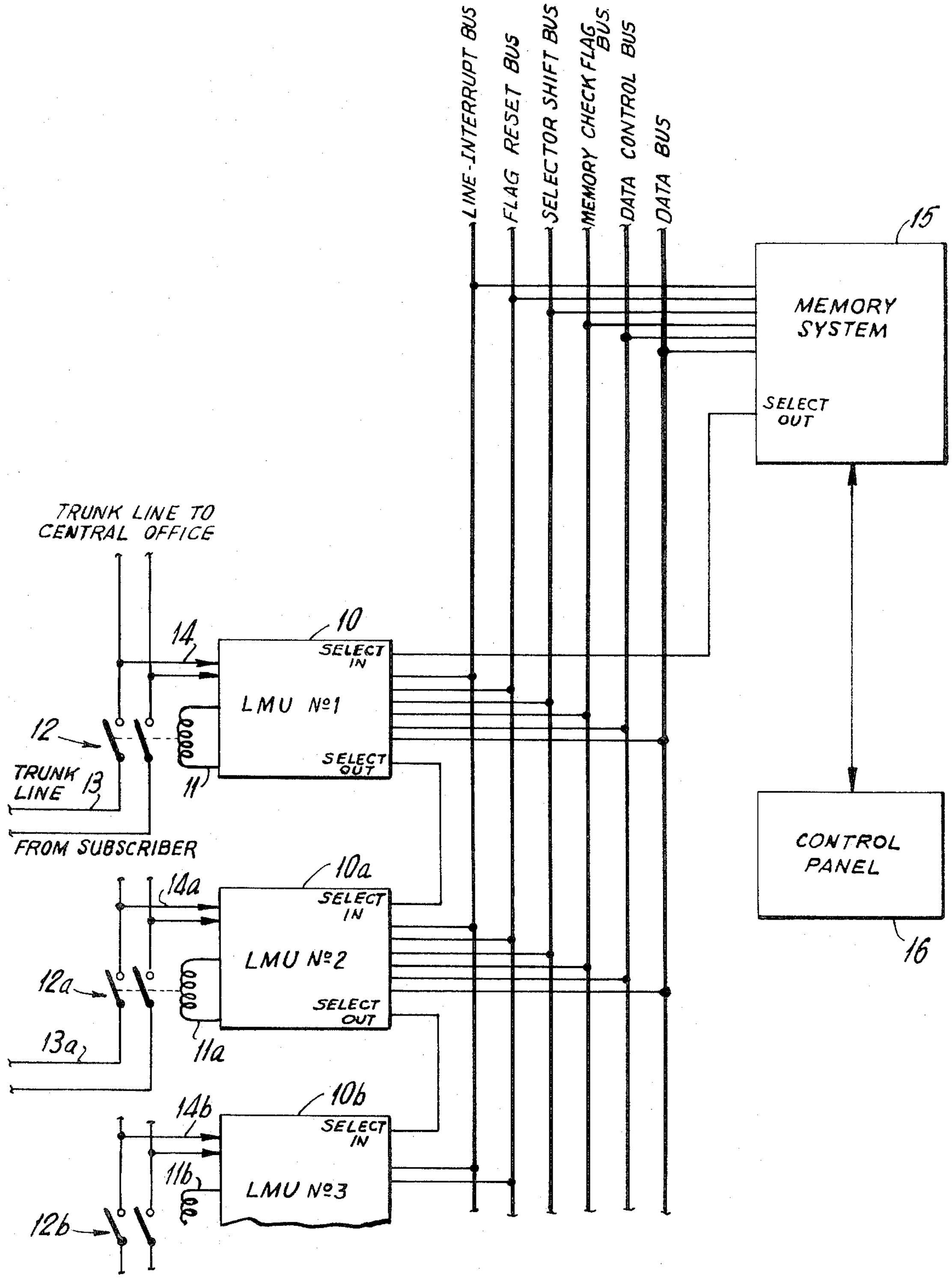
FIG. 1 is a simplified block diagram of the system according to the invention.

Referring now to FIG. 1, there is shown a plurality of line monitor units 10, 10*a*, 10*b*, etc. (LMU) each having a relay coil 11, 11*a*, 11*b* associated therewith. They relay coils each control a switch which is connected between trunk lines 13, 13*a*, 13*b* and respective subscriber handsets or a PBX or PABX. Each line monitor unit is also connected by means of feed lines 14, 14*a*, 14*b* respectively, to the trunk lines and in parallel therewith. In home or public telephone use, each handset has an individual trunk line connected thereto. In PBX, PABX or party line installations, the switches 12, 12*a*, 12*b* and the parallel feed lines 14, 14*a*, 14*b* would be connected onto the trunk lines not the internal system lines. Thus, for private exchange systems, the line monitor units would connect directly to the outgoing trunk lines and will only be activated after a trunk line has been seized by an individual user, but will not be activated by internal calls not affecting the trunk lines.

Each line monitor unit is connected in parallel to a group of interface busses, including a line-interrupt bus, a flag rest bus, a selector shift buss, a memory check flag bus, a data control bus, and a data buss. Memory system 15 is coupled to all of the bus lines and has connected to it a control panel 16 for external control.

The line monitor units are coupled together by interconnecting a SELECT OUT terminal on one line monitor unit with a SELECT IN terminal on the next line monitor unit. The first line monitor unit has its SELECT IN terminal connected directly to the memory system. Each unit sequentially sends a select signal to the next unit after it has been interrogated.

In operation, each line monitor unit monitors the trunk line to which it is connected and detects, decodes and stores the number dialed onto the trunk line. The memory system sequentially sends a series of interrogate pulses onto the selector shift bus. Although the interrogate shift pulse appears on the bus to which all the LMU's are connected, it will only effect the LMU whose SELECT IN terminal has been pulsed from the previous LMU. The shift pulse, in addition to interrogating the LMU's also cause the select pulse to travel to the next LMU. When the select pulse has rippled through the entire series of LMU's, the memory system sends a new select pulse to the first LMU. Accordingly, the selector shift pulse will interrogate the LMU's sequentially effecting only the LMU which has lastly received the select pulse from the previous LMU.

If the LMU being interrogated does not have a dialed number stored, indicating that the telephone on its trunk line was not used for dialing since the last interrogation, then the LMU will merely shift the select pulse to the next LMU. If a number has been stored in the LMU, the LMU will send out a pulse on the memory check flag bus. The flag pulse indicates to the memory system that an LMU needs servicing. The memory system then sends out pulses onto the data control bus which cause the number stored in the LMU to be pulsed onto the data bus to the memory system. The data control pulses, although placed on the common bus line will only effect the one LMU which has sent the flag pulse.

The memory system checks the number against its list of authorized numbers. If the number is on the list, the memory system pulses the flag reset bus which resets the LMU being serviced, and the shifting of the select pulse continues so that sequential interrogation is resumed. If the number checked is not on the authorized list, the memory system pulses the line-interrupt bus which passes to the LMU being serviced and energizes its relay to disconnect the associated switches thereby interrupting the call from being completed. The flag reset bus is then pulsed as before to reset the serviced LMU and sequential interrogation is resumed.

Control panel 16 is used to update the list of authorized numbers contained in the memory system by adding or deleting numbers. Before a number is added, the number is checked against the list to prevent duplicate entries. The control panel also serves to manually check a specific number, obtain a print out of the entire list, tabulate the list according to area codes and exchanges, determine which numbers have not been called, and display the particular number dialed by a user. The programs controlled by the control panel are available only when the memory system is not servicing any LMU's.

Figure 2:
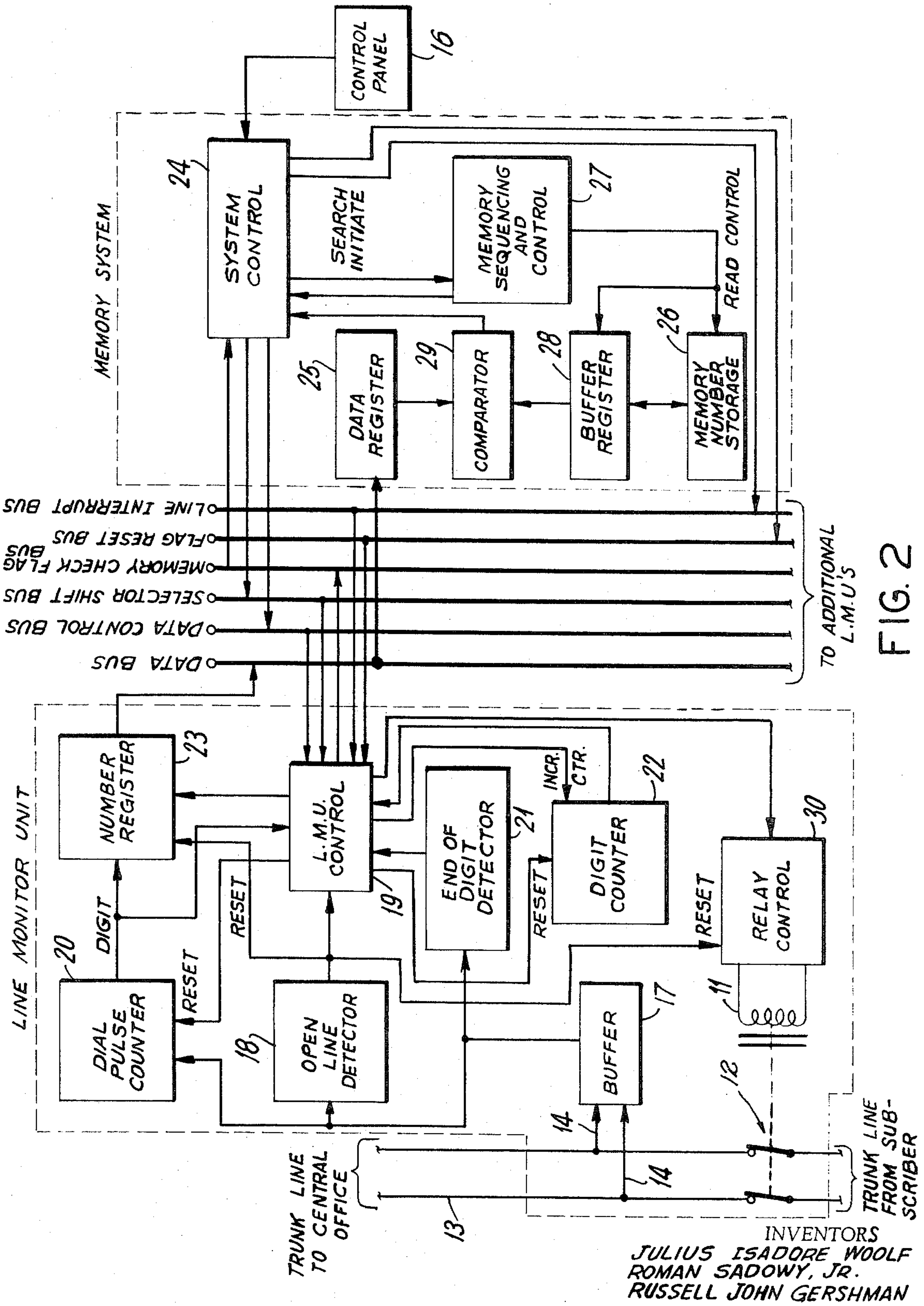
FIG. 2 is a functional block diagram of the system according to the invention.

FIG. 2 shows a more detailed block diagram of the invention in which like parts are labelled with like numerals as in FIG. 1. A single LMU 10 is shown connected in parallel to a trunk line 13 through lines 14. The LMU controls relay 11 which is coupled to switches 12 placed within the trunk line 13. As a number is dialed on the handset, the pulses representing each digit of the number pass from lines 14 through buffer 17. Buffer 17 serves to isolate the telephone lines from the monitoring unit and can be of the type supplied by the telephone companies or can be an amplifier with a high input impedance.

As soon as the line is seized by the subscriber, the open line detector 18 detects a change in the voltage level of the trunk line and activates the LMU control 19. As the digits are dialed, the pulses representing each digit are counted by the dial pulse counter 20. The pulses also pass to the end of digit detector 21 which contains a timing circuit. Telephone dial pulses arrive at a fixed rate of 10 or 20 pulses per second. When the end of digit detector senses a delay longer than 100 msec. it determines an end of digit and signals the LMU control 19. The LMU control 19 then causes the contents of the dial pulse counter 20 to be stored in the number register 23. The LMU control 19 then sends a pulse to the digit counter 22 to advance the digit count. Finally, the LMU control 19 sends a pulse to the dial pulse counter 20 causing it to be reset in preparation for counting the next train of dial pulses.

As the digits are sent from dial pulse counter 20 to number register 23 they are also tested by the LMU control. According to presently accepted telephone standards, the second digit of an area code always contains a 1 or a 0, while the second digit of a telephone exchange will never contain a 1 or 0. The LMU control 19, therefore, tests the second digit dialed for the presence of a 1 or a 0. Should such digit be present, indicating that an area code has been dialed, LMU control 19 will be conditioned to accept 10 digits. Should a 1 or 0 not be detected, indicating that a number has been dialed without an area code, LMU control 19 will be conditioned to accept 7 digits. For future operation when all possible area codes having a 0 or 1 for the second digit have been exhausted, the Bell System intends to use area codes which can have any digit from 0 to 9 in the second position. In this case the method of distinguishing area codes as described above will not be sufficient. The Bell System will then distinguish area codes on the following criteria: The central office switching equipment will wait 3–5 seconds after the seventh digit. If no additional digits are received in this period the first three digits will be regarded as a central office code (exchange number). If an eighth digit is received during the timing period the switching equipment will expect a 10 digit number and will therefore regard the first three digits as an area code. In order to accommodate this future operating mode, the LMU control 19 will contain a 3 second timer to delay the indication of the seventh digit from the digit counter 22. If an eighth digit is received before the seventh digit is indicated the LMU control will expect 10 digits. If the seventh digit is indicated before the any eigth digit, the LMU control 19 will consider the seventh digit to be the last. Similarly, the LMU control 19 is preconditioned to detect the presence of a leading 1 as is required in some dialing systems and in such case will not store the contents of the dial pulse counter 20 in the number register 23 and will not send a pulse to advance the digit counter 22 but will only reset the dial pulse counter 20. In addition, the LMU control 19 is preconditioned to detect the presence of a leading 0. Dialing an initial 0 would enable the subscriber to reach a telephone company operator and have the operator place the call. Since the operator dialed digits would not appear on the subscribers trunk line, they could not be decoded or checked by the system, thus circumventing the intended operation of the system. Therefore, when the LMU control 19 detects the presence of a leading 0 it sends a signal to relay control 30 causing relay 12 to open and interrupt the call.

When digit counter 22 has counted the number of digits expected, i.e. seven digits when no area code has been dialed and ten digits when an area code is included, the LMU control 19 will accept no additional digits until it is interrogated by the memory system 15 or it is reset by a signal from the open line detector 18.

Because the LMU control 19 requires at least seven dialed digits before it will request service from the memory system 15, any dialed number containing less than seven digits will not be checked. As a result, toll free calls to the telephone company information, to the telephone business offices and to emergency numbers, which generally have three digits will not be checked. Also, any number partly dialed and then interrupted by the subscriber because of an error or a change of mind, will also not be checked. When the subscriber replaces the handset on the cradle, open line detector 18 detects an open line and resets LMU control 19, number register 23 and relay control 30. The LMU control in turn resets the digit counter 22 and the dial pulse counter 20. Thus the next time the trunk line is seized by the internal switching equipment (PBX, PABX) or in case of a private line by the lifting of the handset from the cradle, the reset will be released and the LMU will be ready to accept a new dialed number.

The memory system 15 is controlled by system control 24 which pulses the selector shift bus and sequentially interrogates the LMU's. When LMU 10 is interrogated, the LMU control 19 receives the pulse and sends a pulse onto the memory check flag bus indicating that service is requested. The flag pulse is detected by the system control 24 which then generates clock pulses onto the data control bus. LMU control 19 receives the clock pulses and in turn causes number register 23 to pulse out the stored number onto the data bus at the clock rate.

The number is transferred into the memory system 15 and is stored in data register 25. The memory system 15 includes memory storage 26 which contains the authorized list of telephone numbers. Under control of memory sequencing and control 27, memory 26 is caused to sequentially read its contents into buffer register 28 where it is compared with the dialed telephone number stored in data register 25 by means of comparator 29.

Upon initiation from the system control 24, memory sequence and control 27 steps the memory through its contents and compares the telephone number dialed with the stored authorized list. At the occurrence of a comparison, comparator 29 signals the system control 24 indicating an authorized number. The system control 24 pulses the flag reset bus to reset the LMU, returns to its interrogate mode and the telephone call is completed.

If no comparison is made, memory sequencing and control 27 indicates to the system control 24 that the memory has been completely searched with no successful comparison. The telephone number is therefore not authorized and the system control 24 generates a line interrupt pulse on the line interrupt bus. The pulse is transferred to relay control 30 in the LMU 10 which energizes relay 11 to open switch 12 and interrupt the call. Interrogation of the other LMU's is then continued as before.

The control panel 16 is used for externally controlling the memory system 15 as hereinbefore described.

Figure 3:
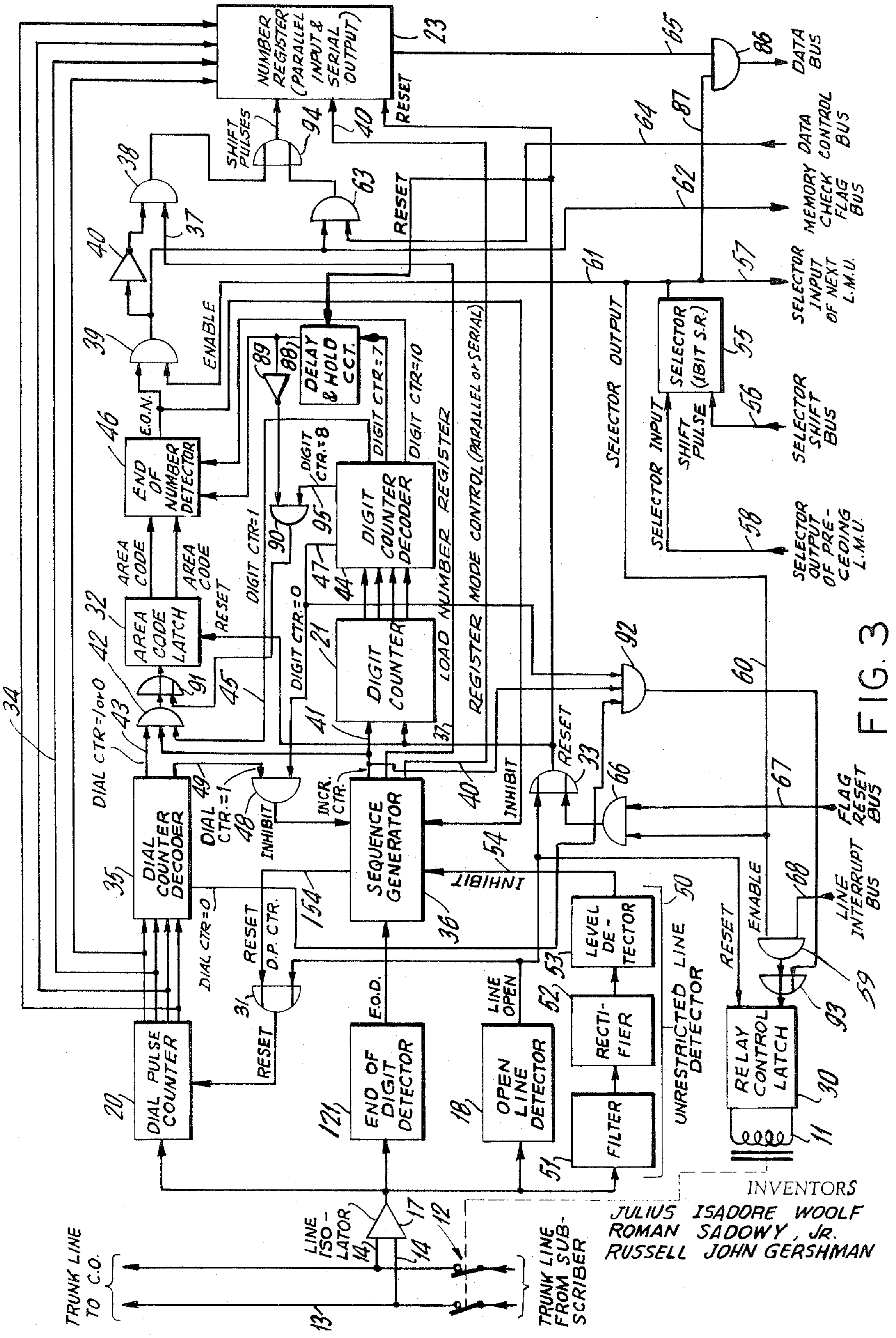
FIG. 3 is a detailed block diagram of one embodiment of a line monitor unit in accordance with this invention.
Figure 4:
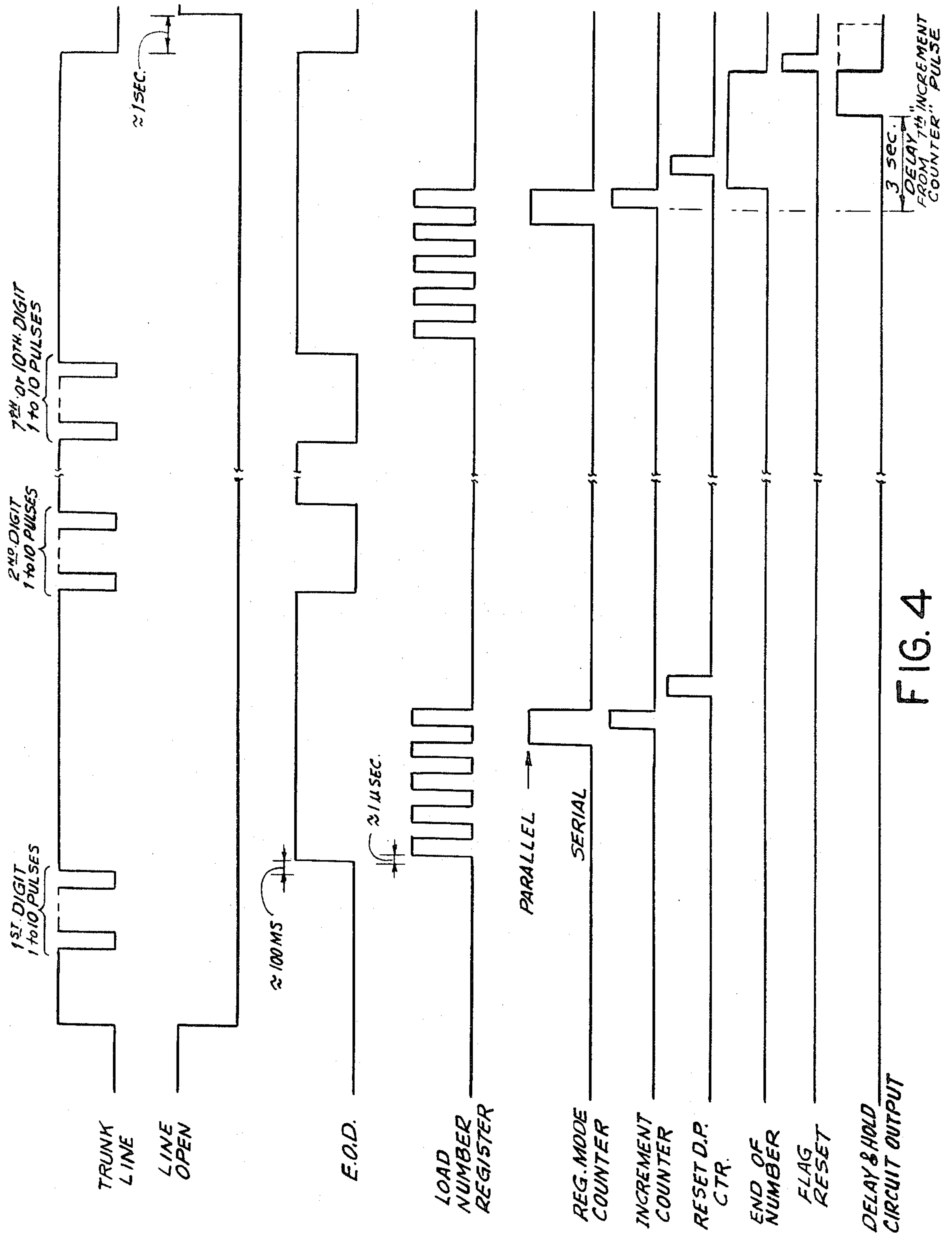
FIG. 4 is a timing diagram, useful in explaining the embodiment of FIG. 3.

Referring to FIGS. 3 and 4, there will be described a detailed functional block diagram and a corresponding timing diagram of a preferred embodiment of the LMU of this invention, wherein like parts are identified as in previous figures. When the subscriber removes the handset from the cradle, open line detector 18 detects through line isolator 17 a change in voltage level and removes a line open signal as shown in FIG. 4. The removal of the line open signal enables the dial pulse counter 20 through OR gate 31, enables digit counter 21, number register 23, delay and hold circuit 88 and area code latch 32 through OR gate 33 and also enables relay control latch 30.

As the subscriber dials the first digit, the pulses comprising that digit pass through line isolator 17 to dial pulse counter 20. The count of pulses pass directly to number register 23 on lines 34 and simultaneously to dial counter decoder 35. End of digit detector 121 is a timing circuit which receives the dialed pulses. Since the pulses arrive at a constant rate of 10 or 20 pulses per second, end of digit detector 121 waits 100 msec after each pulse. If no further pulses appear after the delay, an end of digit (EOD) pulse is generated to sequence generator 36 (FIG. 4). The sequence generator 36 after a 1 usec delay generates a sequence of five "load number register" pulses on line 37 which serves as one input to AND gate 38. The other input to AND gate 38 is the output from AND gate 39 inverted by inverter 40. Since AND gate 39 will have no output until the complete number has been dialed, its output will be "false" and after inversion by invertor 40 the input to gate 38 will be "true" thereby permitting the "load number register" pulses on line 37 to pass through AND gate 38, OR gate 94 and act as shift pulses for the parallel input to number register 23. The "register mode control" signal on line 40 from sequence generator 36 sets the mode of the number register 23 to serial for the first four "load number register" pulses, thus shifting the present contents of the "number register" by 4 bit positions and leaving the first 4 bit positions empty. Then, as shown in FIG. 4, the "register mode control" signal sets the number register 23 in its parallel mode so that the fifth "load number register" pulse causes all 4 bits from the dial pulse counter 20 to be entered in parallel into the first 4 bit positions of the number register 23.

The sequence generator 36 then generates an "increment counter" pulse on line 41 which increments the count on digit counter 21 and also serves as one input to AND gate 42. The output from digit counter 21 proceeds to digit counter decoder 44 which detects if the digit counter is in position zero or one. It is noted from the timing diagram, FIG. 4, that the "increment counter" pulse does not appear until after the first digit has been dialed on the trunk line. Therefore, digit counter 21 is set to zero when the first digit is in the dial counter decoder 35, and the digit counter 21 is in the first position when the dial counter decoder has received the second digit.

In order to detect for the presence of an area code, the second dialed digit must be examined for a 1 or a 0 in accordance with accepted telephone standards. AND gate 42 serves as the area code detector. The dial counter decoder 35 provides an output on line 43 if the digit dialed is a 1 or a 0 and is one input to AND 42. The output from the digit counter decoder 44 on line 45 indicating the second digit dialed on the trunk line, is another input to AND gate 42. The "increment counter" pulse from sequence generator 36, serves as the trigger for AND gate 42. If all inputs are "true" it indicates that the second digit dialed was a 1 or a 0 and gate 42 will have an output which passes through OR gate 91 sets area code latch 32. The end of number detector 46 has an input from the digit counter decoder 44 which indicates when the tenth digit has been dialed. It has an additional input from delay and hold circuit 88 which after a delay of 3 seconds will indicate that the seventh digit has been dialed. When the area code latch is set, it selects the 10 digit input. If the inputs to gate 52 are not all "true" when the "increment counter" pulse arrives, gate 42 will not set the area code latch 32 and the 7 digit input will be used.

Detecting future area codes which do not have an 0 or 1 as the second digit requires the use of delay and hold circuit 88, inverter 89 and AND gate 90. When the digit counter 21 reaches a count of 7 the digit counter decoder 44 will send a true signal to the delay and hold circuit 88. After a delay of 3 seconds the output of the delay and hold circuit 88 will become true indicating to the end of number detector 46 and invertor 89 that the seventh digit has been dialed. At this time the output of inverter 89 will inhibit AND gate 90. If an eighth digit had been dialed during the 3 second delay interval the digit counter decoder 44 would have produced a true signal on lead 95 which passes through AND gate 90 and OR gate 91 and would have set area code latch 32. In this case the end of number detector 46 would wait until the tenth digit to produce a true output. If the eighth digit did not occur during the 3 second delay interval the area code latch 32 would not have been set and the end of number detector 46 would produce a true output when it received the true output from delay and hold circuit 88. For presently operating telephone systems which require a 0 or 1 for the second digit, OR gate 91, AND gate 90, inverter 89 and delay and hold circuit 88 can be deleted. In this case the output of AND gate 42 can be connected directly to the set input of area code latch 32 and the "digit counter = 7" output of the digit counter decoder can be connected directly to the end of number detector 46.

In some sections of the United States it is necessary to dial a leading 1 before an area code or certain exchange. In the embodiment as shown, digit counter decoder 44 will produce an output on line 47 when digit counter 21 is zero, indicating that the first digit was dialed. This signal serves as one input to AND gate 48 where other input is the dialed digit if it is a 1. AND gate 48 will therefore check the first digit for the presence of a 1. If there is a leading 1, which can otherwise never appear as part of an area code or an exchange, gate 48 will generate an inhibit signal to sequence generator 36 not to generate the "increment counter"

pulse or the "load number register" pulses. As a result, the LMU will not count or store the digit but will only count and store the next seven or 10 digits representing the area code, if necessary, and the exchange and line numbers.

In order to prevent a telephone user from reaching a telephone company operator by dialing 0 as the first and only digit, a line interrupt is generated upon detection of this condition. AND gate 92 serves as the detector and has three inputs. The first input from dial counter decoder 35 indicates that the digit dialed was a 0. The second input from digit counter decoder 44 indicates that the digit dialed was the first digit. The third input, from sequence generator 36 is the increment counter pulse which, when the first two inputs are true, passes through AND gate 92 and OR gate 93 and sets relay control latch 30 thus opening relay 12 and interrupting the call.

The embodiment shown in FIG. 3 includes the additional feature of an unrestricted line detector 50. In private exchange systems there may be some telephones which are not to be restricted to the authorized list but which may be used for all telephone numbers. A signal generator, typically of 20 KC frequency, is included on the station lines of the unrestricted telephones such that the 20 KC tone is permanently connected to the station lines as an identifier. This signal is detected in the unrestricted line detector 50 by a 20 KC filter 51. The signal is rectified by rectifier 52 and passes through level detector 53 to produce an inhibit signal to the sequence generator 36 on line 54 which disables the sequence generator 36 whereby the number dialed will not be monitored or checked.

After incrementing digit counter 21 by means of the "increment counter" pulse, sequence generator 36 generates a "reset D.P. Ctr." pulse on line 154 which resets dial pulse counter 20 through OR gate 31. The dial pulse counter 20 is now ready to count the pulses of the next digit dialed onto the trunk line 13.

When digit counter 21 reaches a count of seven (or ten if an area code was detected) digit counter decoder 44 sends a signal to end of number detector 46 which emits an end of number signal (E.O.N.) to AND gate 39. The E.O.N. signal also inhibits sequence generator 36 from producing any further increment pulses. The complete number dialed now appears in number register 23. The LMU remains in this condition until the LMU is interrogated or reset by an open line signal.

The sequential interrogation is accomplished by means of selector 55, which is a 1 bit shift register. Since each LMU has a similar selector, the total selection system is effectively a long shift register with as many stages as there are LMU's. The memory system injects a 1 in the first stage when all of the stages are 0. The memory system then sends shift pulses on the selector shift bus. The shift pulse shifts the register and places the 1 in the second stage associated with the next successive LMU.

As shown in FIG. 3, a particular LMU is sequentially interrogated by first receiving a "selector input" signal from the preceeding LMU on line 58. A pulse from the selector shift bus then causes a 1 to be placed in the selector of that LMU and a 0 to be placed in the selector of the preceding LMU. The shift pulse from the memory system on the selector shift bus will only effect the particular selector that contains a 1 and the selector following it, causing the 1 to be shifted from the former to the latter. The shift pulse arrives on line 56 and the selector output is sent to the selector input of the next LMU on line 57. This effectively causes a 1 to be shifted through the series of 1 bit shift registers (selectors) from one stage to the next stage.

The selector output also enables AND gates 59 and 66 through line 60 and also AND gate 39 along line 61 and also AND gate 86 along line 87. If no number had been dialed on the trunk line 13, there will not be any "end of number signal" at the input to AND gate 39. The selector output pulse will therefore not pass through gate 39 and there will be no changes in the particular LMU or on the bus lines. The memory system will send the next shift pulse which will interrogate the next LMU.

If a number had been dialed on the trunk line being monitored, an "end of number" signal will appear at the input to AND gate 39. The selector output pulse on line 61 will pass through AND gate 39 and send a flag pulse from line 62 onto the memory check flag bus. The output from gate 39 will also be inverted by inverter 40 to inhibit gate 38 which prevents "load number register" pulses from further entering number register 23. The output from AND gate 39 also enables AND gate 63.

When the memory system receives the flag pulse from the memory check flag bus, indicating that the particular LMU interrogated requests service, it sends clock pulses onto the data control bus which arrive on line 64. The clock pulses pass through enabled gate 63, through OR gate 94 to number register 23. As can be seen from FIG. 4, the "register mode control" signal to number register 23 indicates a serial output control, and the number stored in number register 23 will therefore be serially clocked out of register 23 onto the data bus 65. It is noted that the clock pulses arriving on the data control bus actually appear to each LMU, however, only the particular LMU requesting service will have its gate 63 enabled by its selector. The other LMU's have their corresponding gates disabled and will not respond.

The memory system will proceed to check the number against its authorized list. If the number is authorized, the memory system sends a pulse on the flag reset bus 67 which passes through gate 66. Only the particular LMU requesting service will have its gate 66 enabled. The output of gate 66 passes through OR gate 33 to reset digit counter 21 and area code latch 32. The call will be completed and the memory system will continue sending shift pulses on the selector shift bus to resume sequential interrogation of the LMU's.

If the memory system determines that the number is not authorized, it sends a pulse on the line interrupt bus which appears on line 68 and passes through enabled AND gate 59 and or gate 93 to set relay control latch 30. Although the line interrupt pulse appears to all the LMU's, only the one being serviced will have its corresponding gate 59 enabled and only that LMU will be effected. Latch 30 energizes relay 11 which opens the switch 12 thus disconnecting the trunk line and interrupting the call. The memory system then continues sequential interrogation as before.

After the call is interrupted, open line detector 18 waits for approximately 1 sec. to insure that the line has properly been opened, and then returns to its state indicating an unseized line.

In summary, the embodiment of FIG. 3 detects when a line is seized by means of open line detector 18 which resets various segments in preparation for monitoring a dialed number. Dial pulse counter 20 counts the pulses as they are dialed. End of digit detector 121 detects when a digit is completed and signals sequence generator 36. As the digits are dialed, the first digit is checked for a leading 1 which will cause the first count to be inhibited. The second digit will be checked for the presence of a 1 or 0 to set area code latch 32 to expect ten dialed digits instead of the usual seven digits. The digits will be entered into number register 23 under control of sequence generator 36. The LMU will wait until interrogated and will then set a flag indicating service requested. It will also enable internal gates to receive the service response from memory system. The number will be shifted onto the data bus and checked by the memory system. In response to the checking the LMU will either interrupt the trunk line if the number is not authorized or will be reset without interrupting the trunk line if the number is authorized.

Figure 5:
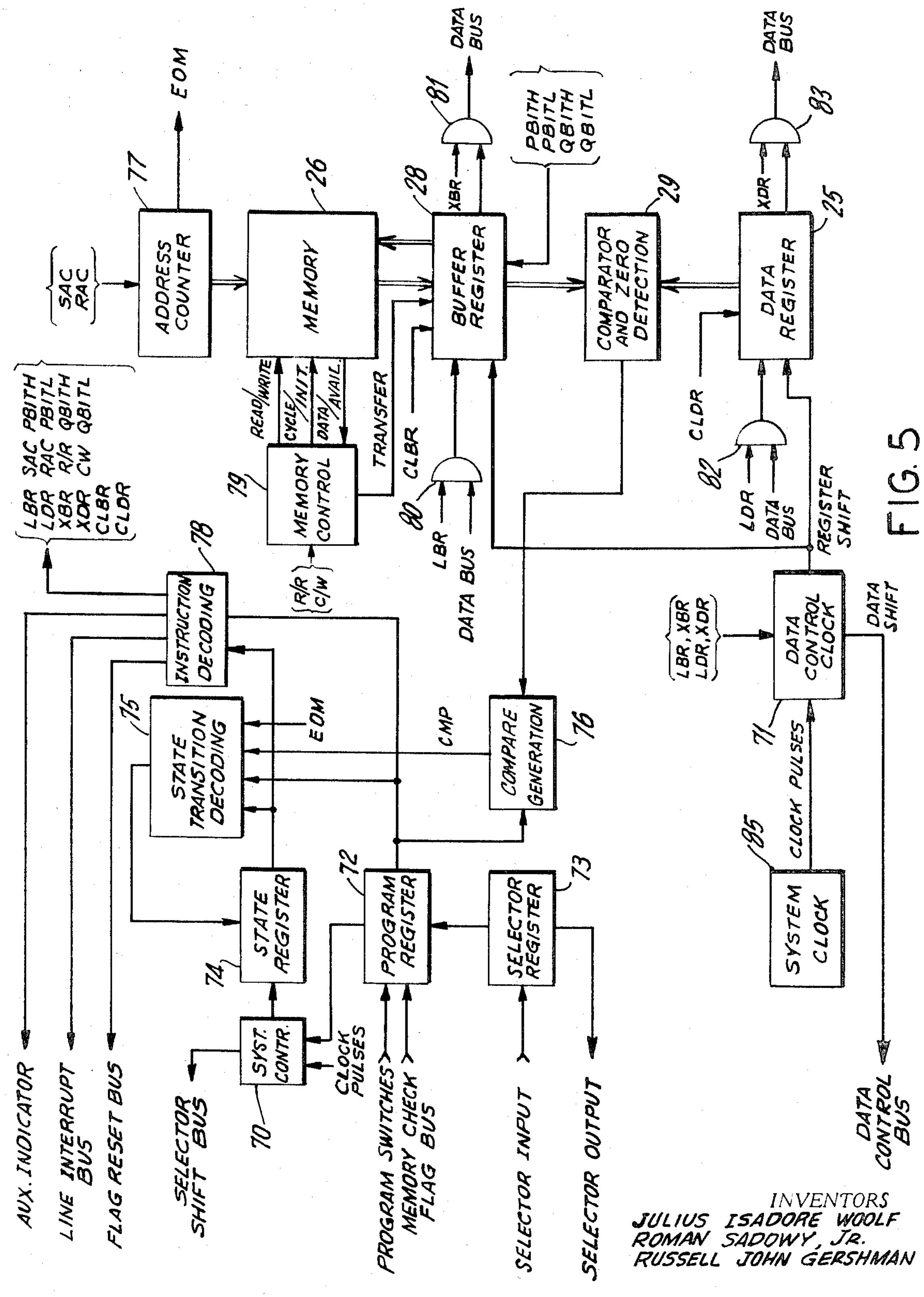
FIG. 5 is a detailed block diagram of one embodiment of a memory system in accordance with this invention.

Referring now to FIG. 5 there is shown a preferred embodiment of the memory system wherein like parts are numbered as in FIG. 2. The system control 70 receives a series of clock pulses from the system clock 85 and sends them onto the selector shift bus. During the interrogate mode, these pulses cause the sequential interrogation of the LMU's. When a particular LMU needs servicing, it sends a pulse on the memory check flag bus which is detected by program register 72. This register inhibits the shift pulses from system control 70 and specifies the end of the interrogate mode and begins the check mode. In addition to the check mode, other program modes are available as will hereinafter be explained. The other program modes are selected by the program switches available on the control panel (FIG. 1). The particular program selected manually by the program switches or the check mode selected automatically, is registered in program register 72. Each program has a number of states through which the memory system is stepped until the program is completed.

The selector register 73 is a serial-in-parallel-out shift register which enables only one of the program register bits at a time. This register is actually a continuation of the selector registers in the individual LMU's, as shown in FIG. 3.

Once a particular program mode is entered as registered on program register 72, state register 74 indicates the particular state of the program presently in operation in the system. This register is a parallel-in-parallel-out register. The state transition decoding 75 specifies the next state to be selected. The selection is based on the present state from state register 74, the program in operation from program register 72, and status indication CMP (compare) from compare generator 76, and EOM (end of memory) from address counter 77. Instruction decoding 78 specifies the particular instruction signals for system operation including:

LBR = load buffer register
LDR = load data register
XBR = transfer buffer register
XDR = transfer data register
CLBR = clear buffer register
CLDR = clear data register
SAC = step address counter
RAC = reset address counter
R/R = read/restore
C/W = clear/write
PBITH, QBITH, PBITL, QBITL = set P bit and Q bit high and low.

The instruction decoding 78 also sends the line interrupt pulse on the line interrupt bus when an unauthorized number has been dialed, and signals the auxiliary indicators on the control panel to indicate the internal state of the memory system.

The data control clock 71 generates a series of pulses. These pulses are transferred onto the data control bus and the register shift lines under the instructions XBR, XDR, LBR and LDR.

Memory 26 is a standard core memory which contains the approved list of authorized numbers. Each number is specified by an address from address counter 77. The instruction SAC causes the contents of the address counter to be incremented by one address corresponding to one telephone number. When address counter 77 had stepped through the entire list, it generates an end of memory signal (EOM). Address counter 77 can at any point be reset by command RAC. The memory 26 is controlled by memory control 79 which permits reading and writing operations in the memory. The memory control responds to the command R/R to have the memory transfer the number specified by address counter 77 to buffer register 28 without destroying the information. In response to the command C/W, memory control 79 causes the memory to clear the contents of the address specified by address counter 77 and write the information stored in the buffer register 28 into that address.

The buffer register 28 provides communication between the memory and other registers in the system. The buffer can be loaded with the contents of the memory. In addition, under instruction LBR, buffer register 28 is loaded with a number from the data bus through AND gate 80. Under the instruction XBR, the number in buffer register 28 is transferred onto the data bus through AND gate 81. Data input and output from buffer register 28 is serial to and from the data bus and parallel to and from the memory 26 and comparator 29.

The data register 25 holds the telephone number from the LMU and other registers. Data is transferred from the data bus to data register 25 through AND gate 82 by the LDR command, and is transferred from data register 25 to the data bus through AND gate 83 by the XDR command.

Comparator and zero detection 29 provides for bit comparison between the contents of buffer register 28 and data register 25. Comparator 29 compares separately the area code, the exchange and the line numbers of the two stored numbers and yields comparison signals for each identical comparison. It is therefore possible to store in the memory a particular area code with all the remaining digits representing a "no-care" condition. This will permit all numbers having that area code to be authorized and yet requires only one stored number in the list. Similarly, an exchange can be listed with all the line numbers having "no-care" conditions, which will permit all numbers within the given exchange to be authorized while only storing one number. Similarly, no-charge numbers such as the telephone information number can be listed with "no-care" conditions which would authorize these numbers. The comparison signals are transferred to compare generation 76 which determines the status of the comparison between the contents of buffer register 28 and data register 25 and generates the CMP signal upon valid comparison.

The operation of the check mode will now be explained. When program register 72 receives the signal on the memory check flag bus indicating an LMU requires servicing, it interrupts system control 70 from sending further interrogate shift pulses and enters the check mode. State register 74 enters the first state which causes instruction decoding 78 to issue an LDR instruction. Data control clock 71 responds by sending clock pulses onto the data control bus which serially transfers the data from the LMU to data register 25 through AND gate 82. Upon completion of this transfer, state register 74 is clocked and put into state two by state transition decoding 75. In state two the instruction SAC is performed. Address counter 77 is stepped by 1. State register 74 is again clocked. If the end of memory has not been reached, no EOM signal exists and decoding 75 places state register 74 in state 3. In state 3 the R/R instruction is performed. Memory control 79 causes memory 26 to read the telephone number stored in the address specified by address counter 77 into buffer register 28. The number in buffer register 28 is compared with the number in data register 25 by comparator 29. If no comparison is made, no CMP signal is generated and on the next clock pulse, decoding 75 will put state register 74 back to state 2. Address counter 77 is again stepped and if no EOM signal is generated state 3 is entered to read the number stored in the next memory address into buffer register 28 for comparison with the number in data register 25.

When a comparison is made, the CMP signal is generated and decoding 75 switches state register 74 to state 4. Here the instructions QBITH and C/W are given. This causes memory control 79 to clear the memory contents of the address stored in address counter 77. A parity bit, Q, is set to 1 in buffer register 28, and the contents of buffer register 28 are written into the memory location cleared. The occurrence of a comparison indicates that the number is authorized and no interruption of the call occurs. The purpose of setting a parity bit is an additional feature whereby it is possible to keep account of those numbers which have been dialed and those which have never been dialed. This permits regular updating of the list by deleting the numbers which have never been dialed.

From state 4 decoding 75 transfers state register 74 to the last state where a flag reset instruction is performed. This clears the flag of the LMU being serviced and transfers control back to the interrogate mode.

If no comparison is made through the whole stored list in memory, then after the last comparison an EOM signal is generated by address counter 77 and decoding 75 puts state register 74 into state 5 were a line interrupt instruction is performed. This instruction sends a pulse on the line interrupt bus to disconnect the trunk associated with the LMU being serviced. From state 5, decoding 75 transfers state register 74 to the last state and the program terminates as before. Address counter 77 is reset under an RAC instruction at the beginning of each mode.

In addition to the interrogate mode and the check mode, the embodiment of FIG. 5 is capable of performing in other program modes. State register 74 is comprised of a bank of flip flops controlled by gates and it sequences through the states in a particular order. By using WIRED OR circuits, it is possible to add additional programs to the capabilities of the system.

One of the additional program modes controlled by the program switches on the control panel, is the manual check. In this mode, a particular telephone number can be checked to determine if it is contained within the authorized list. The telephone number in question is transferred via the data bus to the data register under an LDR command. The cycle of stepping the address counter (SAC), reading the memory into the buffer register (R/R) and comparing is continued until either a comparison results (CMP) or the entire memory is searched without a comparison (EOM). The results are displayed on auxiliary indicators on the control panel.

In the delete mode a desired number from the list can be deleted. The desired telephone number is stored into the data register under an LDR instruction. The list is searched using the cycle as hereinbefore described until a comparison is found. The buffer register is cleared under a CLBR instruction and the number is deleted from memory using a C/W command.

In the enter mode, a new number can be entered onto the authorized list. The number is first checked against the list to avoid duplication. If so, the operation is terminated. If not, the memory is again searched for the first cleared location. When found, the new telephone number is entered.

It is also possible to print out the contents of the memory in an ordered manner by area codes and exchanges. An area code is entered into the data register and the comparison cycle is repeated printing out the numbers containing the given area code. A subsequent area code is entered and all numbers within that area code are then printed out. Similarly, exchanges can be entered in the data register and all numbers having that exchange will be printed out. An area code and exchange is entered into the data register and the comparison cycle is repeated, causing print out of the stored telephone numbers having that area code and exchange. In order to avoid further comparisons with numbers already printed out, a further parity bit, P, is set when a comparison is made and the number printed out. On the next comparison cycle, all numbers having a high P bit will be skipped.

Other programs which are easily implemented with the use of the WIRED OR circuits include memory dump, clear memory, delete Q bit, delete P bit, and display contents of the buffer register and the data register.

There has been disclosed heretofore the best embodiment of the invention presently contemplated and it is to be understood that various changes and modifications may be made by those skilled in the art witout departing from the spirit of the invention.

What is claimed is:

1. In a telephone system including a plurality of telephone sets each able to be coupled to a trunk line, a limited access switching system comprising a central memory system and a plurality of line monitor units, each line monitor unit including:

switching means in series with a trunk line;

monitor means connected in parallel with said trunk line, and detection means capable of detecting through said monitor means a number dialed onto said trunk line, and wherein said central memory system comprises:

memory means containing a list of authorized telephone numbers;

comparison means for comparing the number dialed with the number in said authorized list, and menas for said central memory system sequentially interrogating each of said line monitor units including a plurality of selection means each one of which is associated with one of said line monitor units, said selection means being serially connected such that the output of the selection means of one unit enables the input of the selection means of the next unit.

2. The switching system as in claim 1 and further including parallel bus lines interfacing between said line monitor units, all of which are connected in parallel to said bus lines and said central memory system which is connected directly to said bus lines.

3. The switching system as in claim 1, wherein said switching means further include switches serially interconnected within said trunk line, a relay coil controlling said switches and relay control means for energizing said relay coil and controlled by said central memory system.

4. The switching system as in claim 1, wherein said detection means further include, pulse counting means for counting the pulses as dialed onto said trunk line, digit detector means for sensing the end of a dialed digit and producing an end of digit signal, digit counting means for counting the number of digits dialed, register means for storing the telephone number dialed, and control means controlled by said end of digit signal and in response thereto storing the pulses counted by said pulse counting means into said register means, resetting said pulse counting means and advancing the count on said digit counting means.

5. The switching system as in claim 4, wherein said detection means further include, number detector means for sensing the end of a dialed number and producing an end of number signal.

6. The switching system as in claim 5, wherein said detection means further include area code detection means capable of detecting the presence of a dialed area code and in response thereto setting said number detector means for sensing ten dialed digits and wherein said number detector means normally senses seven dialed digits.

7. The switching system as in claim 6, wherein said area code detection means include means to detect the presence of a 1 or 0 in the second dialed digit.

8. The switching system as in claim 5, wherein said detection means further include leading 1 detection means capable of detecting the presence of a dialed leading 1 and in response thereto inhibiting said control means from advancing the count on said digit counting means.

9. The switching system as in claim 4, and further including open line detecting means for resetting said pulse counting means, said register means and said digit counting means on the occurrence of an open line.

10. The switching system as in claim 1, wherein each said line monitor unit further includes unrestricted line detector means capable of inhibiting said detection means when the telephone handset is one of a predetermined unrestricted class.

11. The switching system as in claim 10 including tone generating means connected to the unrestricted telephones for generating a tone on all unrestricted system lines, and wherein said unrestricted line detector means include tone filter means, rectifier means, and level detection means.

12. The switching system as in claim 1, wherein said monitor means include line isolator means.

13. The switching system as in claim 12, wherein said line isolator is a high impedance input amplifier.

14. The switching system as in claim 1, wherein said detection means include means for producing a service request signal upon detecting a number dialed and wherein said means for sequentially interrogating include means to inhibit further interrogation upon receiving a service request signal in response to the interrogation of the line monitor unit producing the request signal and resuming interrogation after said line monitor unit has been serviced.

15. The switching system as in claim 1, wherein said selection means is a one bit shift register.

16. The switching system as in claim 1, wherein said means for sequentially interrogating further includes shifting means for causing the outputs of the selection means to sequentially shift from one selection means to the next.

17. The switching system as in claim 16, wherein said detection means produce an end of number signal and further including means for producing a flag signal at the simultaneous occurrence of the enabling of the selection means and the end of number signal.

18. The switching system as in claim 17, wherein said comparison means include control means for detecting said flag signal and in response thereto inhibiting said sequentially interrogating means, and comparing the number detected in the line monitor unit which has produced said flag signal with said authorized list.

19. The switching system as in claim 2, wherein said sequentially interrogating means produce a series of shift signals and wherein said bus lines include a selector shift bus line which transfers said signals sequentially to successive line monitor units.

20. The switching system as in claim 19, wherein said detection means produce flag signals after detecting a number dialed and wherein said bus lines further include a data bus and a memory check flag bus, whereby said memory check flag bus transfers said flag signals and said data bus transfers the number detected from the line monitor unit to the memory system, both transfers being subsequent to the line monitor unit receiving a shift signal.

21. The switching system as in claim 20, wherein said comparison means include clock means for producing a series of clock pulses and reset means for producing a reset signal, said bus lines further including a data control bus and a flag reset bus, whereby said clock pulses are transferred from said memory system to the line monitor unit by said data control bus, after said memory system receives said flag signals, and said reset signal is transferred from said memory system to the line monitor unit by said flag reset bus line after said comparison means has completed the comparison.

22. The switching system as in claim 21, wherein said comparison means include means for producing an interrupt signal in the absence of a valid comparison, and said bus lines further including a line interrupt bus, whereby said interrupt signal is transferred from said memory system to the switching means in the line monitor unit.

23. The switching system as in claim 1, wherein said comparison means include first storage means for storing the number detected by said detection means, second storage means for sequentially storing the numbers from said list contained in said memory means, and comparator detection means for comparing the numbers in said first and second storage means and producing an output upon a valid comparison.

24. The switching system as in claim 23, wherein said comparison means further include sequencing control means for sequentially reading the contents of said list from said memory means to said second storage means.

25. The switching system as in claim 24, wherein said telephone numbers contain area code digits, exchange digits and line number digits, and wherein said comparator detection means includes means for producing an output at the valid comparison of each type of digits.

26. The switching system as in claim 25, wherein some of said digits are "no care" digits and said comparator detection means includes means for recognizing said "no care" digits.

27. The switching system as in claim 1, wherein said line monitor unit generates a service request signal upon detecting a dialed number, and wherein said memory system further includes system control means for inhibiting said means for sequentially interrogating upon receiving said service request signal and initiating said comparison means.

28. The switching system as in claim 27, wherein said system control means include program storage means for registering the change from interrogation to comparison, and instruction generating means for generating a sequence of control signals to control said comparison means.

29. The switching system as in claim 28, wherein said comparison means include sequencing means for sequentially controlling the comparisons in stepwise sequence through said list and producing an end of memory signal upon reaching the end of said list, comparator means for generating a comparison signal upon detecting a valid comparison and wherein said control means produce a reset signal in response to said comparison signal and an interrupt signal followed by a reset signal in response to said end of memory signal.

30. The switching system as in claim 29, wherein said comparison means further includes means for recognizing if a particular number in said list has ever been dialed.

31. The switching system as in claim 30, wherein said recognizing means include a parity bit associated with each number in said list which is set upon detecting a valid comparison with such number.

32. The switching system as in claim 29, wherein said control means further include transition means which in response to the generated control signal, the end of memory signal, the comparison signal and said program storage means, cause said instruction generating means to generate the next of the sequence of control signals.

33. The switching system as in claim 1, and further including panel control means for controlling operations on said memory system.

34. The switching system as in claim 33, wherein said panel control means include means for entering new numbers in available positions in said list, means for deleting numbers from said list, means for printing out said list and means for recognizing numbers on said list which have never been dialed.

35. The switching system as in claim 32 and further including panel control means connected to said program storage means, said panel control means capable of instructing the entering of a new number into said list, the deleting of a number from said list, and the printing out of said list, and wherein said program storage means stores said instructions and in response thereto said transition means causes said instruction generating means to generate control signals to carry out said instructions.

36. The switching system as in claim 35, wherein said comparison means further include means for recognizing a particular number previously printed out.

37. The switching system as in claim 1, wherein said detection means further include delay means, responsive to the seventh digit dialed for providing a predetermined delay following said seventh dialed digit, and sensing means for detecting the presence of an eighth dialed digit during said predetermined delay and in response thereto setting said number detector means for sensing 10 dialed digits.

38. The switching system as in claim 4, wherein said detection means further include zero detection means for detecting the presence of a dialed zero as the first digit and in response thereto triggering said relay control means.

* * * * *